Dec. 30, 1930.                D. S. BOYDEN                1,786,642
                              EXPANSION JOINT
                            Filed May 15, 1926
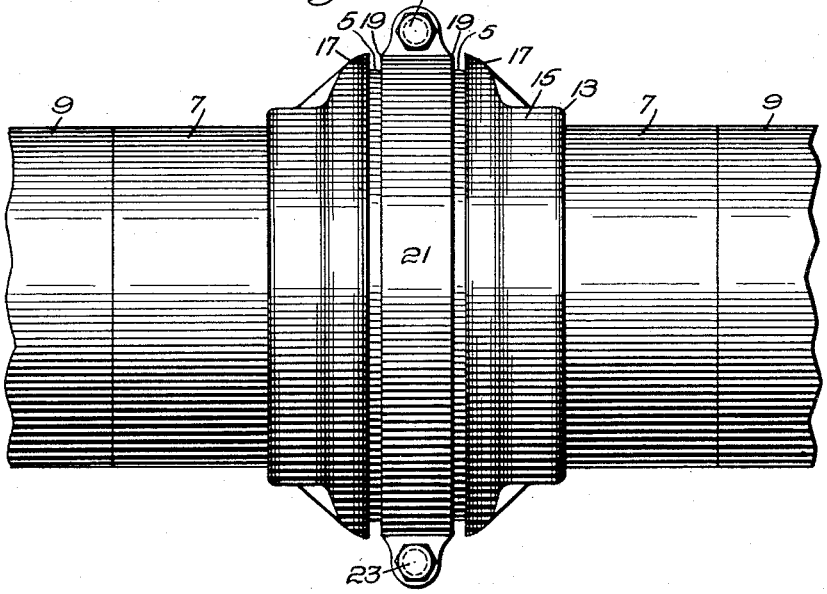
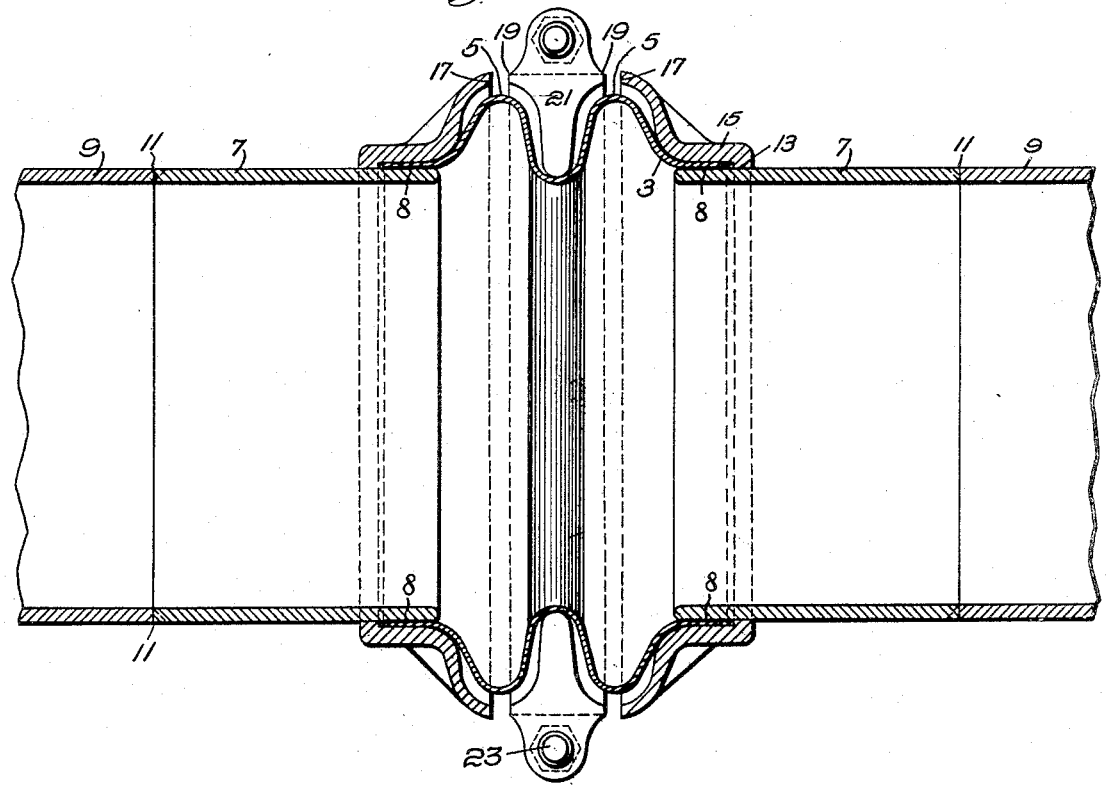
Inventor:
Davis S. Boyden,
by Emery Booth Janney Varney
                    Attys.

Patented Dec. 30, 1930

1,786,642

UNITED STATES PATENT OFFICE

DAVIS S. BOYDEN, OF ALLSTON, MASSACHUSETTS, ASSIGNOR TO E. B. BADGER & SONS COMPANY, OF BOSTON, MASSACHUSETTS, A CORPORATION OF MASSACHUSETTS

EXPANSION JOINT

Application filed May 15, 1926. Serial No. 109,390.

This invention relates to tubular expansion joints employed for coupling together lengths of rigid conduits forming elongated pipe lines, and has for its object the production of a practical but simple expansion joint capable of wider and more general use than those heretofore known.

The invention will be best understood by reference to the following description when taken in connection with the accompanying drawings showing one specific embodiment thereof, while its scope will be more particularly pointed out in the appended claims.

In the drawings,—

Fig. 1 is a side elevation of an expansion joint forming an integral part of a pipe line and embodying one form of the invention; and Fig. 2 is a cross sectional elevation on a somewhat larger scale of the parts shown in Fig. 1.

Referring to the drawings and to the illustrative embodiment of the invention therein shown, the expansion member of the joint is formed by a tubular sleeve or conduit 3 provided with one or more corrugations or circumferential enlargements 5 so as to produce a member capable of expansion and contraction in the direction of its axial length. Any number of such corrugations may be used, dependent on the service in which the joint is to be used, but herein for simplicity there are shown only two such corrugations with one intermediate groove or depression. The expansion member is preferably, though not necessarily, of copper or other non-ferrous metal to enable it readily to undergo repeated expansions and contractions without deterioration.

Each opposite end of the expansion member has secured within it a sleeve 7 preferably of ferrous material and of substantially the same diameter as that of the main pipe line 9. The sleeve 7 preferably projects for a substantial distance from the non-ferrous corrugated sleeve 3 and is herein fitted within the end of the sleeve 3, but, if desired, it might be fitted externally thereof. The sleeve 7 is secured to the expansion member 3 to form a fluid tight joint therewith by any suitable means. It is herein integrally united to the sleeve, as by brazing, thereby forming a joint or union 8 extending circumferentially around the entire sleeve and of sufficient extent to assure a fluid tight union therewith.

In the construction of expansion joints employing expansion members of this type, it has heretofore been customary to provide the expansion member in the pipe line, or to otherwise associate the expansion member with such flanged members either by clamping or some other similar form of mechanical connection as to require the utilization of packed joints. Such construction adds to the number of parts and the expense and, due to the diametrical enlargement of the pipe line at the flanges, requires an increased space to accommodate the pipe line. The presence of the packed joints, furthermore, requires frequent examination of their condition. These factors render such joints impracticable or highly disadvantageous when underground lines are used and the conduits must be buried beneath the earth.

The disclosed embodiment of the invention permits, if desired, the integral connection of the expansion joint member to the pipe line without the use of packed joints, thereby reducing the expense of the pipe line, the number and size of the parts, and avoiding the disadvantages of packed joints.

When the joint is inserted in the pipe line the outside edges of the two sleeves, which, for convenience, are beveled as indicated by dotted lines in Fig. 2, are brought into close abutting relation to the adjacent ferrous conduit members 9 of the main pipe line, and, while there held, are then subjected to a welding operation so that the sleeves 7, and thereby the expansion joint, become united as an integral part of the conduit pipe line, being welded thereto at the abutting edges 11 of the sleeves and pipe members. Preferably the sleeve 7 extends beyond the expansion member for a sufficient distance to prevent the heat of the welding agent from affecting the brazed joint between the sleeve and the expansion member.

Preferably the described joint is provided with devices to equalize and limit the contraction between the corrugated portions of the expansion member. For this purpose each sleeve 7 has secured thereto a closely fitting end ring 13 which provides a sleeve member 15 fitting closely over the ends of the tubular expansion member. The end ring is provided with enlarged, inwardly-turned, projecting edges 17 and is preferably so shaped as to leave sufficient play or movement for the corrugated walls of the expansion member in performing their movements of expansion and contraction without restriction by the inner walls of the end ring, the latter however conforming generally to the shape of the corrugated walls when the latter are fully contracted.

The inwardly turned edges 17 of the opposite end rings, however, are arranged in opposition to but normally separated from the outwardly turned edge portions 19 of an intermediate ring member 21, the latter being located within the groove between the two corrugations 5, also preferably so shaped to conform generally to the corrugated walls when fully contracted but not to interfere with the expansion movement of the corrugated tubular sleeve 3. For convenience in assemblage, the intermediate ring 21 is formed in two diametrically separated parts clamped together by clamping bolts 23.

The opposed edges of the end rings and the intermediate ring are separated at such a distance as to permit of normal movement of contraction and separation. When the expansion member at any one of its corrugations is contracted to the maximum extent desired, the edges of the end ring and intermediate ring at that corrugation contact with each other and prevent further contraction at that part of the joint. When the intermediate ring contacts at both sides with the opposite end rings these three members provide a rigid non-compressible attachment preventing any further contraction of the joint.

The end rings and intermediate ring may be of any suitable rigid material, such as steel, and the end rings 13 are held to oppose undue contraction of the joint through any suitable relationship to the sleeves 3 or 7, being herein fixedly secured to the sleeve by any suitable means, as by being spot welded thereto at several points around the periphery. Where expansion sleeves are provided with a greater number of corrugations the number of intermediate rings is correspondingly increased.

While I have herein shown and described for the purpose of illustration one specific embodiment of the invention, it is to be understood that extensive deviations may be made therefrom without departing from the spirit thereof.

Claims:

1. An expansion joint having an expansion member comprising a corrugated sleeve with cylindrical unflanged ends and separate tubular sleeves fitting within and projecting one from each opposite end of the corrugated sleeve and directly and integrally joined thereto as by brazing to form an integrally united expansion unit, and separate limiting devices for said expansion unit adapted to contact with each other when the joint is contracted but to separate when the joint is expanded, the same including for opposite ends of the expansion unit separate stop members movable relatively to each other on contraction and expansion of the joint, said stop members being concentric with each other and with the adjoining tubular sleeve and with the adjoining cylindrical end of the corrugated sleeve and fitting outside the latter and related to the tubular sleeve to be held thereby against endwise displacement when the joint is contracted independently of said corrugated sleeve.

2. An expansion joint having an expansion member comprising a corrugated sleeve with cylindrical ends and separate tubular sleeves fitting within and projecting one from each opposite end of the corrugated sleeve and directly and integrally joined thereto as by brazing to form an integrally united expansion unit, and separate limiting devices for said expansion unit adapted to contact with each other when the joint is contracted but to separate when the joint is expanded, the same including for opposite ends of the expansion unit separate stop members movable relatively to each other on contraction and expansion of the joint, said stop members being concentric with each other and with the adjoining tubular sleeve and with the adjoining cylindrical end of the corrugated sleeve and fitting outside the latter, said stop member having flanged edges integrally joined to the tubular sleeve and overlying the edges of the corrugated sleeve, whereby said stop member is held against endwise displacement when the joint is contracted, the tubular sleeve projecting beyond the end of the corrugated sleeve and the stop member for a substantial distance, whereby it may be integrally united as by welding to the adjoining end of a pipe line.

3. An expansion joint having an expansion member comprising a corrugated sleeve with cylindrical ends and separate tubular sleeves fitting within and projecting one from each opposite end of the corrugated sleeve and directly and integrally joined thereto as by brazing to form an integrally united expansion unit, and separate limiting devices for said expansion unit adapted to contact with each other when the joint is contracted but to separate when the joint is expanded, the same including for opposite ends of the expansion unit separate stop members movable relatively to each other on contraction and expansion of the joint, said stop members being concentric with each other and with the adjoining tubular sleeve and with the adjoining cylindrical end of the corrugated sleeve and fitting outside the latter, each stop member being connected to said tubular sleeve independently of said corrugated sleeve to be held thereon against endwise displacement when the joint is contracted, the tubular sleeve projecting beyond the end of the expansion member for a substantial distance, whereby it may be united by welding to the adjoining end of a pipe line.

In testimony whereof, I have signed my name to this specification.

DAVIS S. BOYDEN.